United States Patent
Theel et al.

(10) Patent No.: US 10,166,986 B2
(45) Date of Patent: Jan. 1, 2019

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventors: Thomas Theel, Oberhausen (DE); Andras Eppel, Ingolstadt (DE); Jörg Au, Bischoffen (DE)

(73) Assignee: Audi AG, Ingolstadt (DE)

(*) Notice: Subject to any disclaimer, the term of this patent is extended or adjusted under 35 U.S.C. 154(b) by 14 days.

(21) Appl. No.: 15/390,115

(22) Filed: Dec. 23, 2016

(65) Prior Publication Data
US 2017/0183010 A1 Jun. 29, 2017

(30) Foreign Application Priority Data
Dec. 24, 2015 (DE) .................. 10 2015 016 971

(51) Int. Cl.
*B60W 30/18* (2012.01)
*F02N 11/08* (2006.01)
(Continued)

(52) U.S. Cl.
CPC ...... *B60W 30/18072* (2013.01); *B60W 20/19* (2016.01); *B60W 20/40* (2013.01);
(Continued)

(58) Field of Classification Search
CPC ..... B60W 30/18072; B60W 30/18172; B60W 20/19; B60W 20/40; B60W 2520/26;
(Continued)

(56) References Cited

U.S. PATENT DOCUMENTS 5,631,829 A * 5/1997 Takasaki ............ B60K 23/0808
180/248
5,803,197 A * 9/1998 Hara .................. B60K 23/0808
180/248
(Continued)

FOREIGN PATENT DOCUMENTS

DE 10 2011 109 353 A1 9/2012
DE 10 2013 205 010 A1 9/2014
(Continued)

*Primary Examiner* — Joseph Dallo
(74) *Attorney, Agent, or Firm* — Henry M. Feierisen LLC

(57) ABSTRACT

A method for operating a drive device for a motor vehicle includes: during a coasting operation of the motor vehicle in which a shifting clutch is open and the internal combustion engine stands still starting the internal combustion engine in a first operating mode with the electric machine and in a second operating mode by at least partially closing the shifting clutch with a coupling torque set at the shifting clutch, thereby operatively connecting the internal combustion engine with at least one wheel, wherein the internal combustion engine is started in the first operating mode when a predictively determined wheel slip predictive value exceeds a wheel slip setpoint value, and wherein when the internal combustion engine is started in the second operating mode the electric machine is used for starting the internal combustion engine and for driving the at least one wheel when a wheel slip actual value exceeds the wheel slip setpoint value.

12 Claims, 1 Drawing Sheet

(51) Int. Cl.
*F02N 11/10* (2006.01)
*B60W 20/40* (2016.01)
*B60W 20/19* (2016.01)
*F02N 5/04* (2006.01)
*F02N 11/00* (2006.01)

(52) U.S. Cl.
CPC ......... *B60W 30/18172* (2013.01); *F02N 5/04* (2013.01); *F02N 11/0814* (2013.01); *F02N 11/0833* (2013.01); *F02N 11/103* (2013.01); *B60W 2030/1809* (2013.01); *B60W 2520/26* (2013.01); *F02N 11/00* (2013.01); *F02N 2300/2002* (2013.01)

(58) Field of Classification Search
CPC .............. B60W 2030/1809; F02N 5/04; F02N 11/0814; F02N 11/0833; F02N 11/103; F02N 11/00; F02N 2300/2002
See application file for complete search history.

(56) References Cited

U.S. PATENT DOCUMENTS

| | | | | |
|---|---|---|---|---|
| 8,473,172 B2 * | 6/2013 | Gibson | ................ | B60W 10/02 123/179.4 |
| 8,825,324 B2 * | 9/2014 | Horaguchi | ........... | B60K 17/344 701/53 |
| 9,109,475 B2 * | 8/2015 | Mitsuhashi | ........... | F01L 1/3442 |
| 9,352,737 B2 * | 5/2016 | Pietron | ................ | B60W 10/02 |
| 9,376,015 B2 * | 6/2016 | Takaira | ................ | B60K 17/35 |
| 9,555,792 B2 * | 1/2017 | Gibson | ................ | B60W 10/02 |
| 2006/0293145 A1 * | 12/2006 | Lanker | ................ | G01M 13/022 477/34 |
| 2010/0174465 A1 * | 7/2010 | Gibson | ................ | B60W 10/02 701/70 |
| 2010/0222973 A1 * | 9/2010 | Senda | ................ | B60W 10/02 701/54 |
| 2013/0281260 A1 * | 10/2013 | Gibson | ................ | B60W 10/02 477/167 |
| 2014/0100727 A1 * | 4/2014 | Pietron | ................ | B60W 10/02 701/22 |
| 2015/0328983 A1 * | 11/2015 | Takaira | ................ | B60K 17/35 180/233 |
| 2015/0336583 A1 * | 11/2015 | Pursifull | ......... | B60W 30/18109 477/92 |
| 2016/0159356 A1 * | 6/2016 | Hoff | ................ | B60W 30/18172 701/48 |
| 2017/0066447 A1 * | 3/2017 | Hertel | ............. | B60W 30/18172 |
| 2017/0066448 A1 * | 3/2017 | Hertel | ............. | B60W 30/18172 |

FOREIGN PATENT DOCUMENTS

| | | |
|---|---|---|
| DE | 10 2013 211 114 A1 | 12/2014 |
| DE | 10 2013 225 150 A1 | 6/2015 |

* cited by examiner

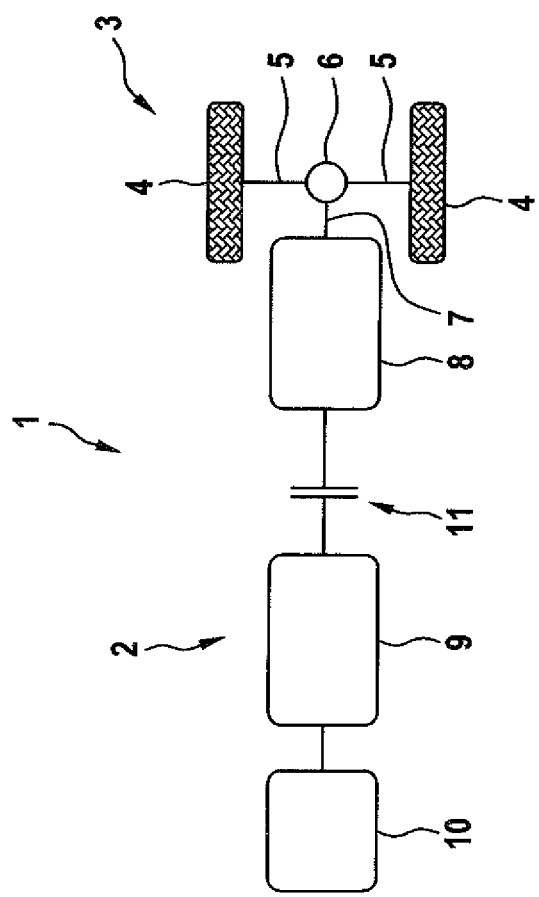

METHOD FOR OPERATING A DRIVE DEVICE FOR A MOTOR VEHICLE AND CORRESPONDING DRIVE DEVICE

CROSS-REFERENCES TO RELATED APPLICATIONS

This application claims the priority of German Patent Application, Serial No. 10 2015 016 971.8, filed Dec. 24, 2015, pursuant to 35 U.S.C. 119(a)-(d), the content of which is incorporated herein by reference in its entirety as if fully set forth herein.

BACKGROUND OF THE INVENTION

The invention relates to a method for operating a drive device for a motor vehicle.

The following discussion of related art is provided to assist the reader in understanding the advantages of the invention, and is not to be construed as an admission that this related art is prior art to this invention.

The drive device serves for driving the motor vehicle, i.e., for providing a torque that is directed toward driving the motor vehicle. The drive device has an internal combustion engine, which can produce the torque either by itself or in cooperation with at least one further drive aggregate. The internal combustion engine can be operatively connected with the at least one wheel of the motor vehicle, in particular with a wheel axle of the motor vehicle on which the wheel is mounted. This purpose is served by the shifting clutch, which is present in the operative connection.

The term shifting clutch means any element, which can be present in at least two different shifting states, wherein in one of the shifting states the operative connection between the internal combustion engine and the wheel is present and in another one of the shifting states the operative connection is interrupted. Generally speaking the shifting coupling is thus a releasable clutch, in particular a releasable force fitting clutch. For example the shifting clutch is a starting element, preferably a starting clutch, a torque converter, in particular a hydrodynamic torque converter, or the like.

When the shifting clutch is open the operative connection between the internal combustion engine and the wheel is interrupted. On the other hand when the shifting clutch is at least partially closed the torque is transmitted from the internal combustion engine to the wheel. When the shifting clutch is completely closed the operative connection between the internal combustion engine and the wheel is preferably rigid or at least almost rigid. Thus when the shifting clutch is completely closed ideally no clutch slip of the clutch occurs.

Starting the internal combustion engine requires to first drag the internal combustion engine to a defined start rotational speed. For this purpose the electric machine is provided which is for example configured as a starter or a starter generator. The electric machine can be permanently operatively connected with the internal combustion engine, i.e., in such a manner that a torque that serves for staring the internal combustion engine is transmitted by the electric machine to the internal combustion engine but on the other hand the running internal combustion engine does not drag the electric machine.

It would be desirable and advantageous to provide a method for operating a drive device for a motor vehicle, which has advantages compared to known methods and enables an efficient and fuel-saving operation of the drive device or the internal combustion engine.

SUMMARY OF THE INVENTION

According to one aspect of the present invention a method for operating a drive device for a motor vehicle, includes: during a coasting operation of the motor vehicle in which a shifting clutch is open and the internal combustion engine stands still starting the internal combustion engine in a first operating mode with the electric machine and in a second operating mode by at least partially closing the shifting clutch with a coupling torque set at the shifting clutch, thereby operatively connecting the internal combustion engine with at least one wheel, wherein the internal combustion engine is started in the first operating mode when a predictively determined wheel slip predictive value exceeds a wheel slip setpoint value, and wherein when the internal combustion engine is started in the second operating mode the electric machine is used for starting the internal combustion engine and for driving the at least one wheel when a wheel slip actual value exceeds the wheel slip setpoint value.

During coasting the speed of the motor vehicle is different from zero for example due to the influence of gravity on the motor vehicle, which causes a forward drive of the motor vehicle. Because in the mentioned exemplary case the forward drive of the motor vehicle is provided by the influence of gravity it can be useful to deactivate the internal combustion engine so that the internal combustion engine thereafter is in the standstill state, i.e., has a rotational speed of zero. Correspondingly no fuel for maintaining the rotational movement of the internal combustion engine is required during idling so that the motor vehicle can be driven in a fuel saving or energy efficient manner.

During the coasting operation of the motor vehicle the internal combustion engine thus stands completely still, while at the same time the shifting clutch is open, in particular completely open. The shifting clutch is thus adjusted so that during the coasting operation of the motor vehicle the internal combustion engine is not dragged along by the rotating wheel of the motor vehicle.

When the motor vehicle is to be switched from coasting operation to a normal operation in which normal operation the internal combustion engine runs, i.e., has a rotational speed which corresponds to at least the idling speed of the internal combustion engine, the internal combustion engine which is in the stationary state during the coasting operation first has to be started. This is provided during a switching from the coasting operation into the normal operation. The starting of the internal combustion engine can for example be performed by means of the electric machine. For this purpose however energy has to be provided which is for example withdrawn from an energy storage of the motor vehicle. Such an approach is provided in the first operating mode.

In order to at least partially avoid the energy required for operating the electric machine and to thus start the internal combustion engine energy-efficiently or more energy efficiently the shifting clutch between the wheel of the vehicle and the internal combustion engine is closed in the second operating mode so that via the shifting clutch the set coupling torque is applied to the internal combustion engine. In such an approach the electric machine is not required or at least not yet, for starting the internal combustion engine. In order to drag the internal combustion engine from the standstill at least one drag torque generated by the internal combustion engine has to be applied to the internal combustion engine. Correspondingly it is advantageous when the coupling torque set at the shifting clutch corresponds at least to or is greater than the drag torque.

Because closing the shifting clutch results in the coupling torque being present at the internal combustion engine, but also with inverse sign at the wheel of the motor vehicle, closing the shifting clutch may have an inadvertent influence on the driving operation of the motor vehicle, in particular when the wheel is situated on a ground with low friction value and/or the vehicle drives through a curve. For this reason it can be provided that the coupling torque is selected variably, i.e., the coupling torque is not fixedly set equal to the drag torque or that the shifting clutch is not closed beyond this drag torque or even completely. Of course the coupling torque used for starting the internal combustion engine can also be selected to be constant.

In order to avoid influencing the driving operation of the motor vehicle, the wheel slip predictive value is predictively determined. The wheel slip predictive value corresponds to the wheel slip at the at least one wheel of the motor vehicle or at the wheels of the motor vehicle, and which is expected based on the current time point, for example in the time period during which in the second operating mode the shifting clutch would be at least partially closed in order to start the internal combustion engine. When the wheel slip predictive value exceeds the wheel slip setpoint value the first operating mode is performed, i.e., the internal combustion engine is started by means of the electric machine. When on the other hand the wheel slip predictive value is smaller than or equal to the wheel slip setpoint value it can be provided that the second operating mode is performed i.e., the internal combustion engine is started by at least partially closing the shifting clutch.

The mentioned wheel slip setpoint value corresponds to a maximally admissive wheel slip, which may for example be reached in dependence on at least one motor vehicle state variable. For example the wheel slip setpoint value is smaller during a curve drive of the motor vehicle than during a straight-ahead drive. In order to determine the wheel slip setpoint value for example the motor vehicle state variable is first determined, which preferably describes an actual driving state of the motor vehicle. By way of the motor vehicle state variable the wheel slip setpoint value can be selected from a plurality of wheel slip setpoint values and/or determined from the at least one motor vehicle state variable. The term wheel slip or an equivalent variable mentioned in the description, i.e., for example the wheel slip setpoint value, a wheel slip actual value and/or a wheel slip of one or multiple wheels, means for example the actual value or preferably the sign-corrected value, i.e., the absolute value.

When the second operating mode is performed, i.e., when the shifting clutch is at least partially or even completely closed for starting the internal combustion, the driving operation of the motor vehicle may be influenced unintentionally, in particular due to the coupling torque acting on the wheel of the motor vehicle. Such an influence is for example recognized when the wheel slip actual value exceeds the wheel slip setpoint value. When such an influence occurs, i.e., when the wheel slip actual value is greater than the wheel slip setpoint value, the influence has to be removed as quickly as possible. One option would be for example to open the shifting clutch, in particular completely, so that the influence of the internal combustion engine on the at least one wheel is removed.

However, because slip already exists when the wheel slip actual value exceeds the wheel slip setpoint value it is particularly advantageous to not only remove the influence of the internal combustion engine but to additionally drive the wheel in order to decrease the wheel slip actual value. For this purpose the electric machine is used. The electric machine is activated when in the second operating mode, in which the internal combustion engine is actually to be started by closing the shifting clutch, the wheel slip actual value exceeds the wheel slip setpoint value. Because in the second operating mode the shifting clutch is at least partially closed the electric machine acts not only on the internal combustion engine for starting the internal combustion engine but also additionally on the at least one wheel. The wheel is insofar driven by the electric machine to decrease the wheel slip actual value, in particular to decrease the wheel slip actual value in the direction of the wheel slip setpoint value, to the wheel slip setpoint value or below the wheel slip setpoint value.

The described approach for operating the drive device has the advantage that in most cases an energy efficient starting of the internal combustion engine can be performed, while at the same time avoiding compromising driving safety for example caused by excessive slip at the at least one wheel, i.e., only one wheel or multiple wheels.

According to another advantageous feature of the invention, an absolute value, a relative value relative to a starting value or a differential value is used as the wheel slip setpoint value. The wheel slip setpoint value is a (theoretical) threshold value for a wheel slip actual value. It can generally be defined in any desired manner. For example by means of the wheel slip setpoint value the wheel slip actual value is limited to the absolute value.

The wheel slip setpoint value may also be used to limit the wheel slip actual value with respect to the starting value. For this purpose the wheel slip setpoint value can be defined as a relative value so that the coupling torque is determined in such a manner so that an increase of the wheel slip actual value above the real value starting from the starting value can be prevented. The starting value is for example the wheel slip actual value that is present at the beginning of switching from coasting operation to normal operation, and which is measured, calculated or estimated.

The differential value describes the derivation of the wheel slip over the time, i.e., the speed with which the wheel slip changes. By a corresponding selection of the wheel slip setpoint value thus the speed of the change, in particular the slope, of the wheel slip actual value can be limited upwards so that the increase of the wheel slip actual value is always smaller than the differential value.

According to another advantageous feature of the invention, in the first operating mode after starting the internal combustion engine the shifting clutch is partially, in particular completely, closed in order to drive the at least one wheel. The first operating mode is performed when the wheel slip prediction value exceeds the wheel slip setpoint value. This means that an increased wheel slip is to be expected. In order to remove such an increased wheel slip it may be necessary to drive the wheel. This is preferably performed by means of the internal combustion engine. This requires to close the shifting clutch as soon as the internal combustion engine is started by means of the electric machine.

According to another advantageous feature of the invention, a wheel slip actual value is taken into account for the determination of the coupling torque, which wheel slip actual value is determined from the measured and/or calculated wheel slip of the at least one wheel of the motor vehicle. The wheel slip actual value at least approximately corresponds to the wheel slip actually present on the wheel of the motor vehicle. The wheel slip actual value can generally be determined in any manner. Preferably it is measured. As an alternative however the wheel slip can also be calculated and/or estimated. The wheel slip actual value is used to determine the coupling torque. The coupling torque is insofar a function of at least the wheel slip actual value. In this way the coupling torque can be particularly reliably limited to a value, which ensures driving safety of the motor vehicle in every situation.

According to another advantageous feature of the invention, the wheel slip actual value is determined from the wheel slip of multiple wheels, in particular by weighted average formation, by differential formation, by sum formation or by ratio formation. The wheel slip actual value thus dos not only describe the slip of only one wheel of the motor vehicle but rather the slip of multiple wheels of the motor vehicle, for example multiple wheels of an axle of the motor vehicle or also wheels which are mounted on different axles. Particularly preferably the wheel slip actual value is determined from the wheel slip of all wheels of the motor vehicle.

In order to determine the wheel slip actual value values for the wheel slip of the wheels are first determined for example measured and/or estimated. These values are converted into the wheel slip actual value, for example by average formation, in particular weight average formation, by differential formation, by sum formation or by ratio formation. Of course also other approaches are possible for example transformation, integration or the like.

According to another advantageous feature of the invention, the wheel slip is determined while a coupling torque is transmitted by the shifting clutch that is different from zero. In particular when the shifting clutch is closed during switching from coasting operation into normal operation while the wheel or the wheels are placed on a ground with low friction value, the coupling torque that now acts on the wheel or the wheels provokes sliding of the at least one wheel, i.e., of the exactly one wheel or the wheels and/or a torque difference between the wheel and at least one further wheel so that the wheel has a higher or lower rotational speed than the at least one further wheel. This reaction can be easily detected so that the wheel slip, in particular the wheel slip actual value, can be determined with high accuracy while the shifting clutch is at least partially closed, i.e., transmits a coupling torque from the wheels to the internal combustion engine, which is different from zero.

In addition or as an alternative the wheel slip can be determined while the torque transmitted via the shifting clutch is zero, but an increase of the transmitted torque, in particular an abrupt increase is imminent. For example the wheel slip is determined over a time period, which includes a time period directly prior to the increase of the transmitted torque as well as a time point of the increase and a time period immediately after the increase.

According to another advantageous feature of the invention, the coupling torque is increased when the wheel slip actual value is greater than the wheel slip setpoint value in order to drive the wheel by means of the electric machine. This is in particular provided in the second operating mode in which the shifting clutch is closed at least partially for transmitting the coupling torque and the electric machine is used for driving the internal combustion engine and the wheel. When the wheel slip for example occurs as a result of a braking process it may be required to drive the wheel in order to reduce the wheel slip. For this purpose the coupling torque is increased.

This can on one hand be performed in the first operating mode when the internal combustion engine was started by means of the electric machine, i.e., it has already reached its idling speed or in the second operating mode, wherein in this operating mode it is not the internal combustion engine that drives the wheel but the electric machine. Preferably the torque provided by the electric machine is selected so that it overcomes the drag torque of the internal combustion engine and additionally drives the wheel. Correspondingly the toque of the electric machine is selected greater that the drag torque.

According to another advantageous feature of the invention, the wheel slip actual value is controlled by open loop or closed loop or is controlled by adjusting the coupling torque to the wheel slip setpoint value or in the direction of the wheel slip setpoint value. The difference between the wheel slip setpoint value and the wheel slip actual value hereby serves for example as a control variable while the coupling torque represents the manipulated variable. The regulation of the coupling torque can generally be performed by means of any controller. Particularly preferably the controller has at east one P-element, at least one I-element and/or a D-element.

According to another advantageous feature of the invention, the coupling torque is adjusted the faster the greater the difference is between the wheel slip setpoint value and the wheel slip actual value. As a result of the adjustment of the coupling torque the wheel slip actual value changes, preferably in the direction of the wheel slip setpoint value. The regulation of the coupling torque is preferably performed until the wheel slip actual value corresponds to the wheel slip setpoint value or is smaller than the wheel slip setpoint value.

According to another advantageous feature of the invention, an actual yaw rate of the motor vehicle is used as motor vehicle state variable, a setpoint yaw rate, a yaw rate difference between the actual yaw rate and the setpioint yaw rate, a roll setpoint, an acceleration, in particular a longitudinal acceleration and/or a transverse acceleration, a steering angle or a trailer coupling state. The motor vehicle state variable can generally be selected arbitrarily. Preferably however the wheel slip setpoint value is determined in dependence on at least one of the mentioned variables, preferably by way of multiple variables, in particular by way of all variables.

The actual yaw rate describes the actual rotational speed of the motor vehicle about its vertical axis, while the setpoint yaw rate describes a theoretically required yaw rate, in particular in order to perform a curve drive. The setpoint yaw rate is for example determined based on a steering angle of the motor vehicle and/or similar variables. The yaw rate difference describes insofar the deviation between the theoretically required setpoint yaw rate and the actually present actual yaw rate. Normally the yaw rate difference is equal to zero or at least close to zero. When the yaw rate difference is different from zero or exceeds a threshold value it can be concluded that the motor vehicle is instable. The greater the yaw rate difference the smaller the wheel slip setpoint value should thus be selected and correspondingly the coupling torque.

In addition or as an alternative the roll speed can be used as motor vehicle state variable. The roll speed describes a rotational movement of the motor vehicle about its longitudinal axis. Also in this case it is usually provided that the wheel slip setpoint value is selected the smaller the greater the roll speed is. When the acceleration is used as motor vehicle state variable it is for example provided that the wheel slip setpoint value is selected the smaller the greater the acceleration is. This is in particular the case when the acceleration is a transverse acceleration. In the case of the steering angle the wheel slip setpoint value can be selected the smaller the smaller the steering angle is. The trailer coupling state finally describes the state of the trailer coupling of the motor vehicle, in particular it describes whether a trailer is coupled to the motor vehicle via the trailer coupling. When this is the case the wheel slip setpoint value is usually selected smaller compared to when no trailer is connected with the motor vehicle via the trailer coupling.

In addition, additional or alternative further motor vehicle state variables can be used, for example a windshield wiper signal, a temperature, in particular an outer temperature, the performance of a wheel brake test operation or the like. It can also be provided to first determined the wheel slip setpoint value based on the motor vehicle state variable and to then adjust it in dependence on at least one of the further motor vehicle state variables. The windshield wiper signal for example reflects the operating mode of a windshield wiper system. Because the outer temperature can be at least an indicator for a road condition it can also be used for determining the wheel slip setpoint value. For example the wheel slip setpoint value is selected the smaller the lower the temperature, in particular the outer temperature, is. The wheel brake test operation is for example used to determine a friction value of the ground or the road. Hereby the torque transferred by the wheel to the ground is changed, in particular abruptly, and the reaction is determined.

According to another advantageous feature of the invention, a torque provided by the electric machine in the second operating mode is selected to be greater than the coupling torque plus a starting torque required for stating the internal combustion engine. The starting torque corresponds for example to the drag torque of the internal combustion engine, in particular at an actual rotational speed of the internal combustion engine. In addition a wheel rotation torque can be determined, which has to be present at the wheel in order to reduce the wheel slip actual value or to change the wheel slip actual value in the direction of the wheel slip setpoint value. The torque can be selected so as to correspond to the sum of the starting torque and the wheel rotation torque required for driving the wheel. In this case the shifting clutch is set to a coupling torque, which is required for transmitting the wheel rotation torque to the wheel.

According to another aspect of the invention a drive device for a motor vehicle, includes: an internal combustion engine; a shifting clutch adapted for operatively connecting the internal combustion engine with at least one wheel of the motor vehicle, and an electric machine for starting the internal combustion engine, wherein the drive device is configured to start the internal combustion engine during a coasting operation of the motor vehicle in which a shifting clutch is open and the internal combustion engine stands still, in a first operating mode with the electric machine and in a second operating mode by at least partially closing the shifting clutch with a coupling torque set at the shifting clutch, thereby operatively connecting the internal combustion engine with at least one wheel, to start the internal combustion engine in the first operating mode when a predictively determined wheel slip predictive value exceeds a wheel slip setpoint value, and when the internal combustion engine is started in the second operating mode to operate the electric machine for starting the internal combustion engine and for driving the at least one wheel when a wheel slip actual value exceeds the wheel slip setpoint value.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic representation of a chassis of a motor vehicle

DETAILED DESCRIPTION OF PREFERRED EMBODIMENTS

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The FIGURE shows a region of a motor vehicle 1, in particular a region of a chassis of the motor vehicle 1. The motor vehicle 1 has a drive device 2 for providing a drive torque for at least one wheel axle 3 at which in the here shown exemplary embodiment two wheels 4 are provided. The wheels 4 are each operatively connected with a differential transmission 6 via a subaxle 5, in particular an axle differential transmission. The subaxles 5 thus represent output shafts of the differential transmission 6. An input shaft 7 of the differential transmission 6 is connected to a switching transmission 8. By means of the switching transmission 8 different transmission ratios between the drive device 2 and the differential transmission 6 or its input shaft 7 can be set.

The drive device 2 has an internal combustion engine 9 and an electric machine 10. The electric machine 10 is for example configured as a starter or a starter generator. It can be or is operatively connected with the internal combustion engine 9 permanently or via a clutch. The internal combustion engine 9 can be operatively connected with the shifting transmission 8 and thus with the wheels 4 via a shifting clutch 11 of the drive device 2. The wheels are insofar drivable or driven wheels or are provided on a drivable axle. Beside the wheels 4 of course at least another wheel, in particular multiple wheels that are assigned to a further axle can be present. These wheels can be configured as non-driven wheels or the further axle can be configured as a non-driven axle. As an alternative of course a drive aggregate for example an electric machine can be assigned to the at least one further wheel.

When the internal combustion engine 9 is at standstill, for example during a coasting operation of the motor vehicle 1, the shifting clutch 11 is open, in particular completely open, so that an operative connection between the internal combustion engine 9 and the wheels is completely interrupted. In order to switch from the coasting operation into a normal operation in which the internal combustion engine 9 is in operation and hereby has a rotational speed, which at least corresponds to the idling speed of the internal combustion engine 9, the internal combustion engine 9 has to be dragged out of the standstill to a defined rotational speed.

This can be provided by means of the electric machine 10. As an alternative the shifting clutch 1 can be at least partially closed in order to transmit a coupling torque from the wheels 4 via the shifting clutch 11 to the internal combustion engine 9. The latter is preferred because the energy required for starting the internal combustion engine 9 is withdrawn from the kinetic energy of the driving motor vehicle 1. On the other hand an operation of the electric machine 10 while withdrawing electrical energy for example from the energy storage of the motor vehicle 1 is not required, may however be performed optionally. On the shifting clutch 11 a coupling torque for starting the internal combustion engine 9 is set which is to be transmitted via the shifting clutch 11. Correspondingly the shifting clutch 11 is at least partially closed in order to start the internal combustion engine 9.

It is provided to perform a first operating mode when a predictively determined wheel slip predictive value exceeds a wheel slip setpoint value. When this is not the case a second operating mode can be performed. In the first operating mode the internal combustion engine 9 is started by means of the electric machine 10, in particular solely by means of the electric machine 10, wherein the shifting clutch 11 is completely open. In the second operating mode on the other hand the internal combustion engine 9 is driven by partially closing the shifting clutch 11 and is thus started. The wheel slip setpoint value is hereby a threshold value for a wheel slip actual value, which is present between at least one of the wheels 4 or both wheels 4 and aground of the motor vehicle 1. The wheel slip setpoint value is for example different for different motor vehicle state variables. The motor vehicle state variables may for example include an actual yaw rate of the motor vehicle 1, a setpoint yaw rate, a yaw rate difference between the actual yaw rate and the setpoint yaw rate, a rolling speed, an acceleration, in particular a longitudinal acceleration or a transverse acceleration or a trailer coupling state.

In the second operating mode the electric machine 10 is first deactivated, i.e., it does not generate a torque for driving the internal combustion engine 9. However when during the stating of the internal combustion engine 9 by means of the electric machine 10 in the second operating mode it is determined that a wheel slip exceeds the wheel slip setpoint value the electric machine 10 is additionally operated in order to start the internal combustion engine 9 and to drive the wheels 4 or at least one of the wheels 4. This allows supporting the driving operation of the motor vehicle 1 also when the shifting clutch 11 is at least partially closed during the second operating mode.

With the described configuration of the drive device 2 or the motor vehicle 1 and the explained approach an energy efficient starting of the internal combustion engine 9 can be achieved, while at the same time ensuring a safe driving of the motor vehicle 1. The driving operation is also not adversely influenced when the motor vehicle 1 or its wheels 4 are on a ground with low friction value.

What is claimed as new and desired to be protected by Letters Patent is set forth in the appended claims and includes equivalents of the elements recited therein:

What is claimed is:

1. A method for operating a drive device for a motor vehicle, said method comprising:
   during a coasting operation of the motor vehicle in which a shifting clutch is open and the internal combustion engine stands still starting the internal combustion engine in a first operating mode with the electric machine and in a second operating mode by at least partially closing the shifting clutch with a coupling torque set at the shifting clutch, thereby operatively connecting the internal combustion engine with at least one wheel,
   wherein the internal combustion engine is started in the first operating mode when a predictively determined wheel slip predictive value exceeds a wheel slip setpoint value, and
   wherein when the internal combustion engine is started in the second operating mode the electric machine is used for starting the internal combustion engine and for driving the at least one wheel when a wheel slip actual value exceeds the wheel slip setpoint value.

2. The method of claim 1, wherein the wheel slip setpoint value is one of an absolute value, a relative value with respect to a starting value and a differential value.

3. The method of claim 1, further comprising after starting the internal combustion engine in the first operating mode at least partially closing the shifting clutch, to drive the at least one wheel.

4. The method of claim 3, wherein after starting the internal combustion engine in the first operating mode the shifting clutch is closed completely to drive the at least one wheel.

5. The method of claim 1, further comprising determining the coupling torque by taking a wheel slip actual value into account, said wheel slip actual value being determined based on at least one of the measured wheel slip of the at least one wheel and the calculated wheel slip of the at least one wheel.

6. The method of claim 1, wherein the wheel slip actual value is determined from a wheel slip of multiple wheels of the motor vehicle.

7. The method of claim 6, wherein the wheel slip actual value is determined from the wheel slip of the multiple wheels of the motor vehicle by one of weighted average formation, differential formation, sum formation and ratio formation.

8. The method of claim 5, wherein the wheel slip is determined while a coupling torque, which is different from zero is transmitted via the shifting clutch.

9. The method of claim 1, further comprising increasing the coupling torque increased when the wheel slip actual value is greater than the wheel slip setpoint value to drive the wheel by means of the electric machine.

10. The method of claim 1, further comprising controlling the wheel slip actual value by open loop or closed loop control to the wheel slip setpoint value or in the direction of the wheel slip setpoint value by adjusting the coupling torque.

11. The method of claim 1, wherein a torque provided by the electric machine in the second operating mode is selected so that said torque provided by the electric machine is greater than the coupling torque and a starting torque required for starting the internal combustion engine.

12. A drive device for a motor vehicle, comprising:
   an internal combustion engine;
   a shifting clutch adapted for operatively connecting the internal combustion engine with at least one wheel of the motor vehicle, and
   an electric machine for starting the internal combustion engine, wherein the drive device is configured
   to start the internal combustion engine during a coasting operation of the motor vehicle in which a shifting clutch is open and the internal combustion engine stands still, in a first operating mode with the electric machine and in a second operating mode by at least partially closing the shifting clutch with a coupling torque set at the shifting clutch, thereby operatively connecting the internal combustion engine with at least one wheel,
to start the internal combustion engine in the first operating mode when a predictively determined wheel slip predictive value exceeds a wheel slip setpoint value, and
when the internal combustion engine is started in the second operating mode to operate the electric machine for starting the internal combustion engine and for driving the at least one wheel when a wheel slip actual value exceeds the wheel slip setpoint value.

* * * * *